(12) United States Patent
LaPierre et al.

(10) Patent No.: US 9,637,313 B2
(45) Date of Patent: May 2, 2017

(54) LUG LOADER

(71) Applicant: USNR, LLC, Woodland, WA (US)

(72) Inventors: Andre LaPierre, Vancouver, WA (US); Damon Clinch, Woodland, WA (US)

(73) Assignee: USNR, LLC, Woodland, WA (US)

( * ) Notice: Subject to any disclaimer, the term of this patent is extended or adjusted under 35 U.S.C. 154(b) by 0 days.

(21) Appl. No.: 14/635,862

(22) Filed: Mar. 2, 2015

(65) Prior Publication Data

US 2015/0368046 A1 Dec. 24, 2015

Related U.S. Application Data

(63) Continuation of application No. 14/055,513, filed on Oct. 16, 2013, now Pat. No. 9,022,203.

(Continued)

(51) Int. Cl.
*B65G 47/244* (2006.01)
*B65G 15/58* (2006.01)
(Continued)

(52) U.S. Cl.
CPC ............ *B65G 15/58* (2013.01); *B65G 15/12* (2013.01); *B65G 37/00* (2013.01); *B65G 43/08* (2013.01); *B65G 47/2445* (2013.01); *B65G 47/31* (2013.01); *B65G 2201/0282* (2013.01); *B65G 2203/041* (2013.01); *B65G 2811/0626* (2013.01); *B65G 2811/0631* (2013.01); *B65G 2811/0673* (2013.01)

(58) Field of Classification Search
CPC B65G 15/58; B65G 47/31; B65G 2201/0282; B65G 2203/041

USPC ....... 198/382, 401, 415, 575, 577, 604, 620, 198/622, 623
See application file for complete search history.

(56) References Cited

U.S. PATENT DOCUMENTS 5,100,125 A * 3/1992 Uplinger ............. B65H 5/02
198/726
5,924,548 A * 7/1999 Francioni .......... B65G 47/2445
198/415

(Continued)

OTHER PUBLICATIONS

Canadian Examiner's Report for CA 2,830,302 mailed Mar. 12, 2015.

(Continued)

*Primary Examiner* — Leslie A Nicholson, III
(74) *Attorney, Agent, or Firm* — Schwabe Williamson & Wyatt, P.C.

(57) ABSTRACT

Embodiments provide methods, systems, and apparatuses for loading workpieces in a flow direction into the spaced apart lugs on a lugged conveyor with the workpieces oriented transverse to the flow direction. The lug loader includes an array of pairs of endless conveyors configured to convey workpieces toward a lugged conveyor. The first and second endless conveyors of each pair are spaced laterally apart across the flow direction and aligned substantially in the flow direction. The array can form a continuous or discontinuous transport surface. Some pairs of endless conveyors in the array may overlap one or more other pairs of endless conveyors in the array. At least one pair of endless conveyors in the array may include two or more endless conveyors that are independently driven at different speeds and/or in different directions to de-skew a workpiece.

30 Claims, 7 Drawing Sheets

Related U.S. Application Data

(60) Provisional application No. 61/714,690, filed on Oct. 16, 2012.

(51) Int. Cl.
*B65G 47/31* (2006.01)
*B65G 15/12* (2006.01)
*B65G 37/00* (2006.01)
*B65G 43/08* (2006.01)

(56) References Cited

U.S. PATENT DOCUMENTS

| | | | | |
|---|---|---|---|---|
| 6,164,431 A | * | 12/2000 | Morisod | B31B 1/02 198/415 |
| 7,097,029 B2 | * | 8/2006 | Halang | B65G 17/24 198/395 |
| 7,233,840 B2 | * | 6/2007 | Schiesser | B65G 15/22 198/395 |
| 7,578,382 B2 | * | 8/2009 | Kujat | B65G 47/31 198/415 |
| 7,703,597 B2 | * | 4/2010 | Jansen | B65G 47/2445 198/415 |
| 7,938,247 B2 | * | 5/2011 | Kujat | B65G 47/31 198/415 |
| 8,434,609 B2 | * | 5/2013 | Buerge | B65H 9/106 198/415 |
| 2012/0228085 A1 | * | 9/2012 | Sjogren | B65B 35/24 198/415 |

OTHER PUBLICATIONS

Canadian Patent Application No. 2830302 Office Action dated Feb. 1, 2016, 3 pages.

* cited by examiner

LUG LOADER

CROSS REFERENCE TO RELATED APPLICATIONS

The present application is a continuation of U.S. patent application Ser. No. 14/055,513, and titled "LUG LOADER," which claims priority to U.S. Patent Application No. 61/714,690, filed Oct. 16, 2012, and titled "LUG LOADER," the entire disclosure of which is hereby incorporated by reference.

TECHNICAL FIELD

Embodiments herein relate to the field of lumber processing, and, more specifically, to methods, systems, and apparatuses for loading workpieces onto a lugged conveyor.

BACKGROUND

Conventional lug loaders or singulators (hereinafter collectively referred to as either lug loaders or singulators) have been found to be inadequate at higher feed speeds. They are also limited in their ability to both singulate and allocate lumber. When lumber is of varying widths and varying in thickness, or bowed, as may be predominant in curve sawing mills, cupped or crooked, and/or skewed on the transfer, it becomes increasingly difficult to handle the lumber at desirable higher speeds.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1:
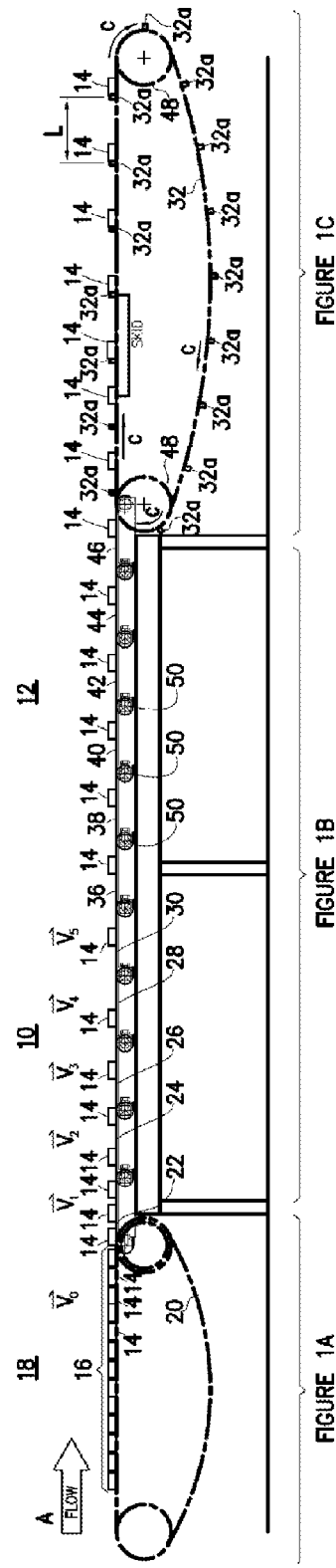
FIG. 1 illustrates a side elevation view of a prior virtual lug loader shown in an elongated view having component views in FIGS. 1A, 1B and 1C intended to be viewed side-by-side in sequence.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "NB" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

In various embodiments, methods, apparatuses, and systems for loading a lugged conveyor are provided. In exemplary embodiments, a computing device may be endowed with one or more components of the disclosed apparatuses and/or systems and may be employed to perform one or more methods as disclosed herein.

Examples of virtual lug loaders are disclosed in U.S. Pat. Nos. 7,578,382 and 7,938,247, both of which are owned by the assignee of the present application, which is directed to a lug loader. The disclosures of the patents are substantially reproduced below for ease of reference.

Embodiments herein provide methods, systems, and apparatuses for the singulation or allocation of lumber into lug spaces on a lugged transfer, or other lumber conveying device.

Some embodiments provide a system for collecting, singulating, straightening, allocating and consistently spacing, rough sawn lumber or planed finished lumber, or sticks of varying widths, thickness and lengths into consecutive spaced-apart lugs, or allocated spacings onto a transfer, or lugged transfer, or to a stick placing device, at high speeds.

The present disclosure relates to a transfer system. The transfer system makes use of conveyors such as chains or belts to move lumber pieces downstream while oriented traversely across the flow path. The lumber pieces enter the virtual lug loading system according to the present invention moving transversely. The lumber pieces may enter as a tightly spaced sheet or mat of pieces with no gaps, or the lumber pieces may be randomly spaced and oriented.

Within the system pairs of transfers create consistent gaps between individual lumber pieces. The transfers within a pair may be driven individually or ganged together. In one embodiment individual transfers or pairs of transfers are selectively and independently actuable to vary their speeds so that the gaps may be created and/or workpieces may be de-skewed.

The transfers may create and maintain gapping, that is the spacing between lumber pieces, and allow a surge capacity. Being individually driven, the transfers also provide for skew correction should the lumber pieces arrive skewed or skew during a transition from one transfer to another. These transfers gap and straighten the pieces as required so that one piece is positioned into each lug space on downstream lugged transfer chains. Thus, individually driven belts provide skew correction to correct the orientation of skewed lumber pieces on the infeed to the lugged transfer being loaded. Keeping the lumber pieces straight, that is oriented traversely across the flow path on the infeed, helps deal the lumber pieces into the lug spaces.

Dealing the boards directly into lug spaces without a mechanical lug loader simplifies the loading of the lug spaces in the lugged transfer as compared to the prior art. It improves operator access, and reduces the amount of mechanical components requiring maintenance.

In one aspect of the present invention, servo controlled decks singulate the lumber pieces and position them directly into a lugged chain.

In summary, a lug loader as described herein may be operable for loading workpieces in a flow direction into the spaced apart lugs on a lugged conveyor, wherein the workpieces are transversely oriented relative to the flow direction. The lug loader includes an array of pairs of endless conveyors for conveying the workpieces downstream, wherein each pair of endless conveyors in the array include two or more endless conveyors spaced laterally apart across the flow direction. The array forms a continuous or discontinuous upper surface in the flow direction for supporting the workpieces translating downstream in the flow direction. Optionally, each pair of endless conveyors in the array may overlap adjacent pairs of endless conveyors in the array. At least one pair of endless conveyors in the array includes independently actuable first and second drives independently driving their corresponding first and second endless conveyors.

Advantageously, at least some of the endless conveyors of a pair or pairs of conveyors are independently actuable so as to correctly orient skewed workpieces anywhere along the transfer system. The pairs of endless conveyors may translate the workpieces in the flow direction at relatively similar downstream velocities between an upstream end and a downstream end of the lug loader.

The independently actuable pairs of endless conveyors may each have corresponding selectively actuable drives so that each of those pairs of endless conveyors is asymmetrically actuable to drive one endless conveyor ahead of another endless conveyor to correct skew of a workpiece on any one of those endless conveyors.

The adjacent pairs of endless conveyors in the array may overlap at adjacent ends thereof by one endless conveyor of the adjacent pairs being inset laterally across the flow direction relative to a corresponding second endless conveyor of the adjacent pairs.

The present disclosure also is intended to include within its ambit a method of virtual lug loading corresponding substantially to the use of the above described apparatus.

Figure 2:
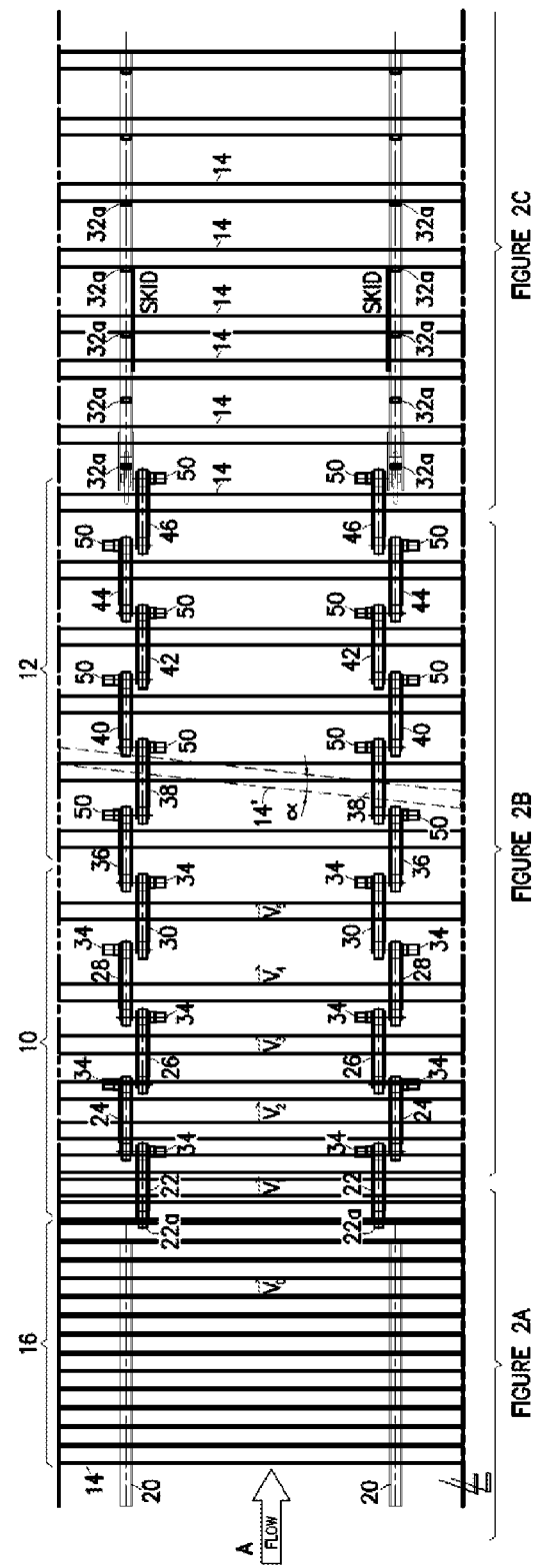
FIG. 2 is a plan view of the virtual lug loader of FIG. 1 shown in an elongated view having component views in FIGS. 2A, 2B and 2C intended to be viewed side-by-side in sequence.
Figure 3:
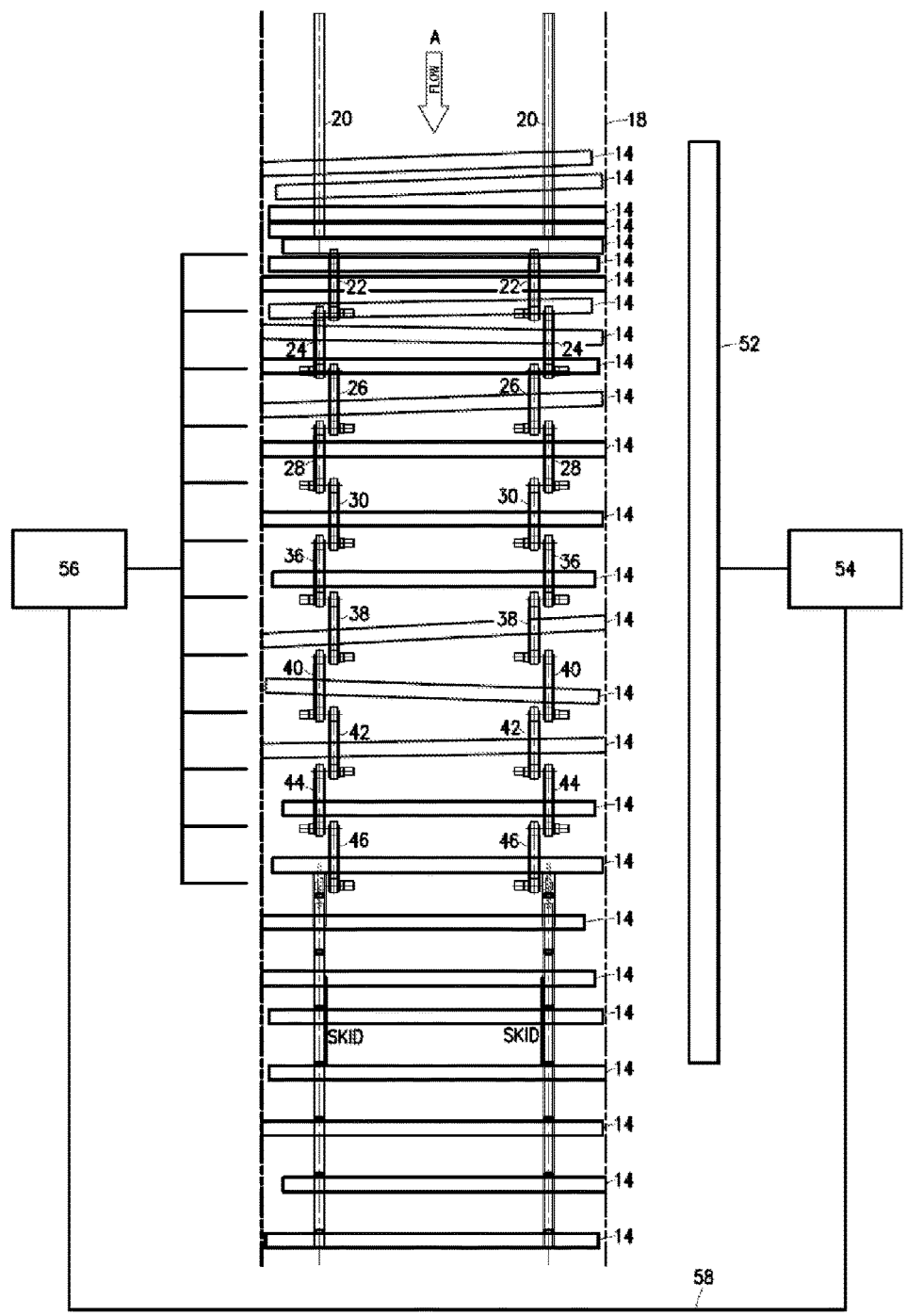
FIG. 3 illustrates the lug loader of FIG. 2 showing, diagrammatically, sensors and controls.

As seen in FIGS. 1-3, wherein similar characters of reference denote corresponding parts in each view, the Virtual Lug Loader disclosed in U.S. Pat. Nos. 7,578,382 and 7,938,247 includes a gapping section 10 immediately upstream, relative to a direction of flow A, of lug loading section 12. Workpieces 14 arrive in direction A so as to form a mat or blanket 16 of workpieces 14 on infeed transfer 18. Workpieces 14 arriving at the upstream end of infeed transfer 18 may be fed from, for example, a tilt hoist, a landing table, an unscrambler, or other wood handling machinery.

Mat 16 is formed on infeed transfer 18 as the workpieces are slowed on transfer belts at the downstream end of infeed transfer 18, workpieces 14 are urged onto the upstream ends 22a of a first pair of belts 22 for progressively faster translation of each workpiece 14 in direction A as the workpieces are transferred from the downstream end of infeed transfer 18 onto sequentially and progressively faster successive pairs of belts 22, 24, 26, 28, and 30 within gapping section 10. Gapping section 10 may, alternatively, may be thought of as a lumber separation zone. Thus, a workpiece 14 having a velocity Vo in direction A on infeed transfer 18, will, once handed off to the first pair of belts 22, have a downstream velocity V1, and then sequentially increasing velocities V2, V3, V4, V5 thereby sequentially increasing the separation between individual work pieces 14 by reason of the progressive acceleration of the boards between pairs of belts.

Advantageously, the separation between individual workpieces 14 is increased as the length of the gaps, distance G between adjacent workpieces is increased, for example to approximately one hundred twenty-five percent of the length of each lug space, distance L, between lugs 32a of lugged outfeed chains 32. It is understood that, although five pairs of belts 22-30 are illustrated, it is not intended to limit the present invention to five pairs of belts in gapping section 10 as more or fewer pairs of belts will suffice so long as sequential workpieces 14 are separated in direction A so that the gap distance G is at least equal to lug space distance L.

The pairs of belts 22, 24, 26, 28 and 30 in gapping section 10 may each be driven by variable frequency drives or induction motors 34 along with associated gear heads. In the illustrated example, not intended to be limiting, each of the five speed-up zones corresponding to the five belt pairs are approximately sixteen inches long so that the length in the downstream direction of gapping section 10 is approximately six foot, eight inches.

In some embodiments, lug loading section 12 is immediately downstream, and cooperates with, the downstream end of gapping section 10 so that workpieces 14 are smoothly handed off from belts 30, being the downstream most pair of belts in gapping section 10, to the first pair of control zone belts 36 located immediately downstream of the interface between gapping section 10 and lug loading section 12. Lug loading section 12 is a workpiece control zone wherein skew may be corrected such as the skew of a workpiece 14' illustrated in dotted outline on control zone belts 38. Skew correction is accomplished by each belt in each pair of control zone belts 36, 38, 40, 42, 44, and 46 being able and adapted to selectively operate at different speeds. In order to correct skew, for example a skew angle alpha (a) of a skewed workpiece 14 the two belts 38, and subsequent downstream belts as need be, are driven at different speeds relative to one another as board 14' passes over the belts, so that the lagging end of the board catches up with the advanced end of the board until the board is correctly positioned perpendicularly across the direction of flow A.

Apart from operating to correct the skew of workpieces translating downstream in direction A, the independently actuable control zone belts in the belt pairs of lug loading section 12 also, in addition to those belts in gapping section 10, operate to selectively space the boards apart and synchronize the boards with upcoming lugs 32a as the lugged outfeed chains 32 rotate in direction C. Thus the control zone belts are driven by a motion controller (not shown) to accelerate or decelerate pairs of belts 36, 48, 40, 42, 44 and 46 to simultaneously accelerate or decelerate both belts in individual pairs of belts so as to accelerate or decelerate a workpiece which has been corrected for a skew. This is done to synchronize and match the placement of a particular workpiece into, for example, the middle of a corresponding lug space as the workpiece exits the downstream end of lug loading section 12. Thus as may be seen, the acceleration or deceleration of the sequence of workpieces 14 being translated downstream over the sequential array of pairs of belts 38, 40, 42, 44 and 46, are selectively motion controlled so as to place a workpiece 14 entering onto the upstream end of the lugged outfeed chains 32 preferably into for example the middle of a corresponding lug space or otherwise exiting off the downstream end of belts 46 just after a pair of lugs 32a rotate to the vertical as chains 32 rotate endlessly around sprockets 48.

In the illustrated embodiment of FIGS. 1-3, not intended to be limiting, lug loading section 12 has six control zone belt pairs may be thought of as six belt modules each approximately sixteen inches long in the downstream direction for a total downstream length of eight feet. In one preferred embodiment, the motors 50 which selectively individually drive each belt in each belt module, may be servo motors having corresponding gear heads.

It is understood that sensors 52 such as seen in FIG. 3 and known in the prior art, and as would be known to one skilled in the art, would be provided to detect the position of individual boards and that the information from the sensors is processed by a digital processor 54 cooperating with the sensors and that the digital processors also cooperates with a programmable logic controller (PLC) 56 via network 58 which in turn cooperates with the motors for selectively driving the belts 22, 24, 26, 28 and 30 in gapping section 10 and belts 36, 38, 40, 42, 44 and 46 in lug loading section 12.

Figure 4A:
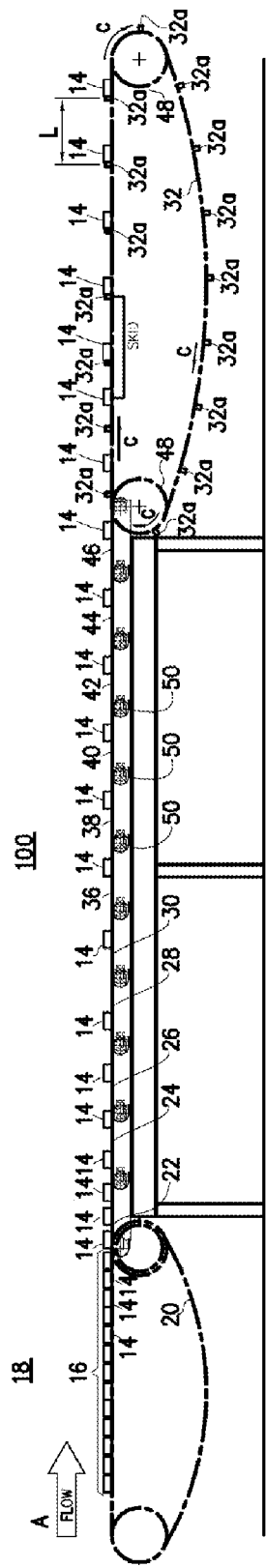
FIGS. 4A-C illustrate a present embodiment of a lug loader and control system.
Figure 4B:
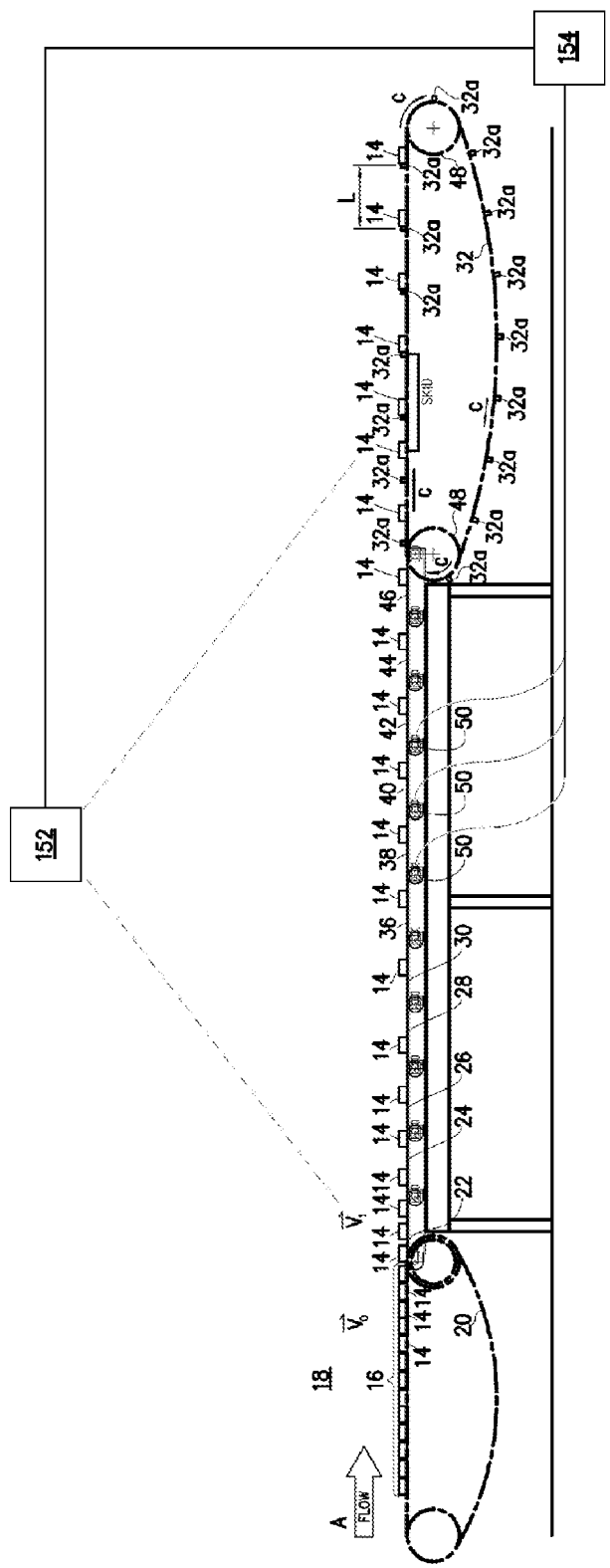
Figure 4C:
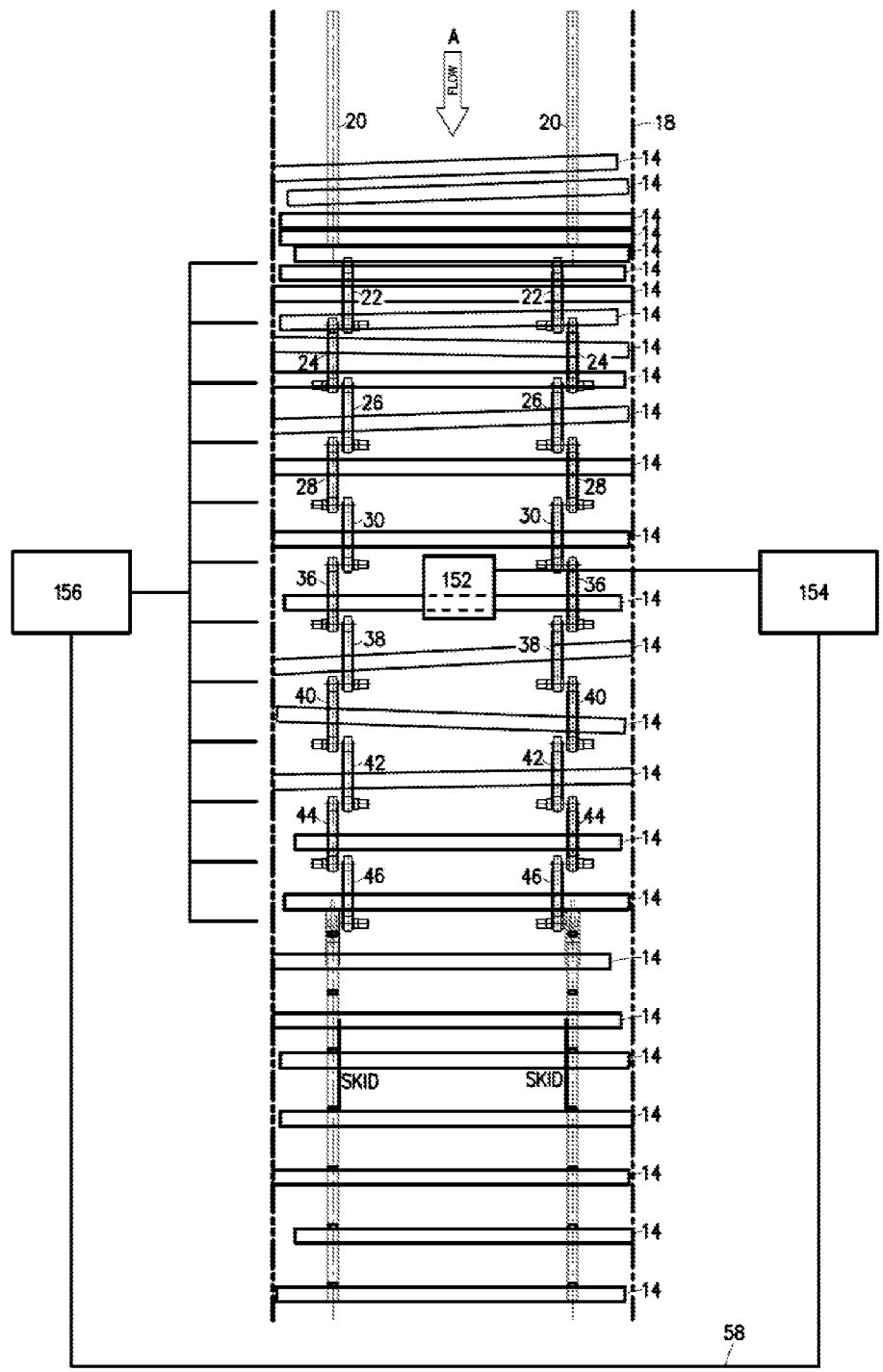
Figure 5:
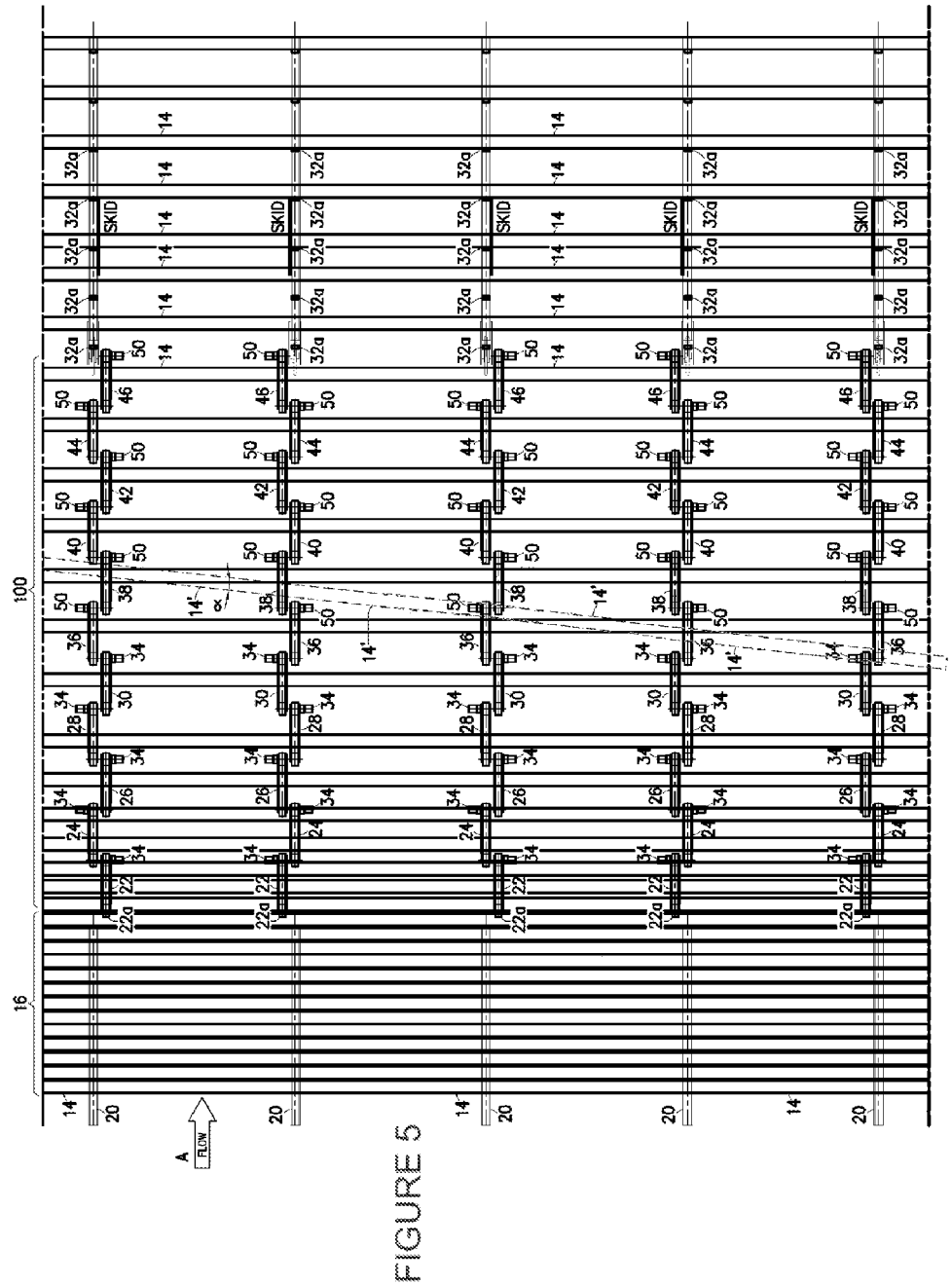
FIG. 5 illustrates another present embodiment of a lug loader, all in accordance with various embodiments.

FIGS. 4A-C and 5 illustrate present embodiments of a lug loader and control system. In the embodiment of FIGS. 4-5, to facilitate the description, components substantially similar to those components identified in FIGS. 1-3 are identified by the same reference characters. Unless otherwise indicated, such components may function in the same or similar manner as described above.

In contrast to the virtual lug loader disclosed in U.S. Pat. Nos. 7,578,382 and 7,938,247, the present embodiment of a lug loader system includes a combined gapping and de-skewing section 100 between infeed transfer 18 and the lugged conveyor (FIG. 4A). Again, successive workpieces 14 are urged from infeed transfer 18 onto the upstream ends 22a of a first pair of belts 22. First pair of belts 22 may be driven at a speed that is greater than the speed of infeed transfer 18. Unlike the above-described embodiment, gaps are created between the workpieces 14 by driving the successive pairs of belts 22, 24, 26, 28, 30, 36, 38, 40, 42, 44, and 46 within section 100 at generally the same or similar speeds. Thus, a workpiece 14 having a velocity Vo in direction A on infeed transfer 18, will, once handed off to the first pair of belts 22, have a downstream velocity V1, and will continue to have approximately the same velocity while traveling on successive pairs of belts except while being de-skewed, if necessary (see e.g., FIGS. 4B and 5).

It is understood that, although eleven pairs of belts 22-46 are illustrated, it is not intended to limit the present invention to eleven pairs of belts in section 100 as more or fewer pairs of belts will suffice. In addition, although the present description refers to "pairs" of belts, it is to be understood that a "pair" may include two, three, four, five, or more than five belts arranged across the direction of workpiece flow. For example, one or more of the pairs of belts 22, 24, 26, 28, 36, 38, 40, 42, 44, and 46 may include five belts, allowing for use of the lug loader to load longer lengths of lumber onto a lugged conveyor. Thus, a relatively long workpiece that is skewed may have a first end that is in contact with a belt of one pair and an opposite end that is in contact with a belt of another pair (see e.g., FIG. 5).

Optionally, one or more of the belts of a pair may be set at different vertical heights. For example, a pair of belts arrayed across the direction of flow may include a first belt at a first side of the conveyor that is positioned at a first vertical distance D1 from an underlying support surface (e.g., a floor), a second belt that is positioned at a second vertical distance D1, a third belt that is positioned at a third vertical distance D3, a fourth belt that is positioned at a fourth vertical distance D4, and a fifth belt that is at the opposite side of the conveyor and is positioned at a fifth vertical distance D5. The vertical heights may increase incrementally from D1 to D5 (e.g., by 0.25 inches). As a result, workpieces conveyed along this pair of belts may be in contact with only two belts. Thus, a workpiece of relatively short length may be in contact with the first belt and the second belt, a workpiece of intermediate length may be in contact with the first belt and the third belt, and a relatively long workpiece may be in contact with the first belt and the fifth belt. In some embodiment, multiple pairs of belts may be arranged in such a manner.

The pairs of belts 22, 24, 26, 28, 30, 36, 38, 40, 42, 44, and 46 in section 100 may each be driven by variable frequency drives or induction motors 34 along with associated gear heads. Skew may be corrected along the length of section 100, such as the skew of a workpiece 14' illustrated in dotted outline in FIG. 5. FIG. 5 shows a relatively long workpiece skewed such that a first end of the workpiece is engaging a first belt of the pair of belts 38 and a second opposite end of the workpiece is engaging a fifth belt of the pair of belts 30. Skew correction is accomplished by selectively operating the two belts in contact with the workpiece to operate at different speeds. Typically, this is done by operating one of the two belts to rotate at a greater speed than the other of the two belts. However, skew correction may alternatively be done by operating one of the two belts to rotate in the direction of flow and operating the other of the two belts to rotate in the opposite direction. In any case, one or more of the belts in at least some of the pairs of belts 22, 24, 26, 28, 30, 36, 38, 40, 42, 44, and 46 may be selectively operated at different speeds in order to correct skew. For example, to correct a skew angle alpha (a) of a skewed workpiece 14, the first belt of the pair of belts 38 and the fifth belt of the pair of belts 30 (and subsequent downstream belts as need be) are driven at different speeds or in different directions relative to one another as board 14' passes over the belts. The belts may be selectively driven to apply relatively greater speed to the lagging end of the board, or to slow the advanced end of the board, until the board is correctly positioned perpendicularly across the direction of flow A.

Apart from operating to correct the skew of workpieces translating downstream in direction A, the belt pairs of section 100 also operate to selectively space the boards apart and synchronize the boards with upcoming lugs 32a as the lugged outfeed chains 32 rotate in direction C. Thus some or all of the belts may be driven by a motion controller (not shown) to simultaneously accelerate or decelerate the belts within individual pairs of belts so as to accelerate or decelerate a workpiece which has been corrected for a skew. This is done to synchronize and match the placement of a particular workpiece into, for example, the middle of a corresponding lug space as the workpiece exits the downstream end of section 100. Thus as may be seen, the acceleration or deceleration of the sequence of workpieces 14 being translated downstream over the sequential array of pairs of belts are selectively motion controlled so as to place a workpiece 14 entering onto the upstream end of the lugged outfeed chains 32 preferably into for example the middle of a corresponding lug space or otherwise exiting off the downstream end of belts 46 just after a pair of lugs 32*a* rotate to the vertical as chains 32 rotate endlessly around sprockets 48.

In the illustrated embodiment of FIGS. 4-5, not intended to be limiting, section 100 has eleven belt pairs. However, other embodiments may have six, seven, eight, nine, ten, twelve, more than twelve, or fewer than six belt pairs. In one preferred embodiment, motors 50 may selectively individually drive one or more of the belts in a pair. Optionally, motors 50 may be servo motors having corresponding gear heads.

In contrast to the virtual lug loader disclosed in U.S. Pat. Nos. 7,578,382 and 7,938,247, which disclosed sensors 52 (FIG. 3) to detect the position of individual boards, the present embodiment includes a vision camera 152 mounted above the lug loader apparatus such that the field of view encompasses most or all of the pairs of belts (FIGS. 4B, 4C). The vision camera 152 may be coupled to a computer system 154. Computer system 154 may in turn be operatively coupled to motors 50, programmable logic controller 156, a driver of infeed 18, and/or a driver of the lugged conveyor. Together, vision camera 152 and computer system 154 may comprise a vision based lumber flow management system that optimizes lumber flow during processing. Such a system may reduce the expense of installing and maintaining multiple sensors. In addition, the overhead vision camera may provide a clear view of the workpieces and be less susceptible to dust and moisture and reducing the need for frequent maintenance (e.g., lens and reflector cleaning).

The vision based system operates by creating a virtual array of presence detection points along the lug loader. As workpieces travel through the detection area, the system recognizes the presence or absence of workpieces as well as width, length, and skew of the workpieces. Based on this and other data, the computer system 154 may send commands to programmable logic controller (PLC) 156 which in turn cooperates with the motors 50 for selectively driving the belts 22, 24, 26, 28, 30, 36, 38, 40, 42, 44 and 46 in section 100. In this manner, the computer system 154 may selectively drive the belts to de-skew workpieces and create desired gaps between them. Optionally, computer system 154 may also send commands to one or more drivers of infeed 18 and/or the lugged chain conveyor based on this and other data (e.g., to speed or slow infeed 18 and/or the lugged chain conveyor).

While the above description refers to loading a lugged chain conveyor, it is to be understood that a lug loader as described herein may alternatively be used to de-skew and/or create gaps between workpieces upstream or downstream of any other apparatus. Examples include, but are not limited to, a sorter, a ducker, a translineator, a cutting device, and a grading station.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

We claim:

1. An apparatus for transporting successive workpieces in a flow direction, with the workpieces in a generally transverse orientation, the apparatus comprising:

a plurality of conveyor modules arranged consecutively in the flow direction to form a continuous workpiece support surface, wherein each of the conveyor modules includes corresponding first and second endless conveyors spaced laterally apart across the flow direction and oriented substantially parallel to the flow direction, wherein a downstream end of a first one of the first endless conveyors overlaps an upstream end of a next consecutive one of the first endless conveyors in the flow direction, and said first one is laterally offset from said next consecutive one, and wherein one or more of the conveyor modules further includes a third endless conveyor spaced laterally apart from the corresponding first and second endless conveyors and oriented substantially parallel to the flow direction; and a drive system having a plurality of drives operatively coupled with corresponding ones of the endless conveyors, wherein the drive system is configured to drive each of the first and second endless conveyors independently of one another and independently of the endless conveyors of another one of the conveyor modules;

wherein the drive system is selectively operable to drive the first and second endless conveyors to thereby adjust skew angles of the successive workpieces and gaps between the successive workpieces while transporting the workpieces in the flow direction on the plurality of conveyor modules.

2. The apparatus of claim 1, further including a first transfer disposed upstream of the conveyor modules and positioned to transfer the successive workpieces to said first one of the conveyor modules disposed at an upstream end of the plurality of conveyor modules.

3. The apparatus of claim 1, wherein at least one of said drives is operatively coupled with the third endless conveyor, and the drive system is selectively operable to drive the third endless conveyor independently of the corresponding first and second endless conveyors.

4. The apparatus of claim 3, wherein the third endless conveyor is positioned at a different vertical height than the corresponding first endless conveyor.

5. The apparatus of claim 1, wherein the third endless conveyor and the corresponding second endless conveyor are operatively coupled to a corresponding one of the drives, such that the third endless conveyor and the corresponding second endless conveyor are driven synchronously by the drive system.

6. The apparatus of claim 1, wherein the drive system is selectively operable to drive some or all of the endless conveyors in a first rotary direction and in an opposite second rotary direction.

7. The apparatus of claim 1, wherein said plurality of conveyor modules includes 2-5 of said conveyor modules.

8. The apparatus of claim 7, wherein the first transfer includes at least one endless belt or chain that overlaps one of the endless conveyors in the flow direction, the apparatus further comprising a second transfer positioned to accept the successive workpieces from a last one of the conveyor modules disposed at a downstream end of the plurality of conveyor modules, wherein the second transfer includes another endless belt or chain that overlaps one of the endless conveyors of said last one of the conveyor modules.

9. The apparatus of claim 8, wherein the drive system is configured to drive the endless conveyors to transport the successive workpieces on the conveyor modules at a generally constant velocity between the first one of the conveyor modules and the last one of the conveyor modules.

10. A system for transporting successive workpieces in a flow direction, wherein the workpieces are oriented generally transverse to the flow direction, the system comprising:
   a plurality of conveyor modules arranged consecutively in the flow direction to form a continuous workpiece support surface, wherein each of the conveyor modules includes corresponding first and second endless conveyors spaced laterally apart across the flow direction and oriented substantially parallel to the flow direction, wherein a downstream end of a first one of the first endless conveyors overlaps an upstream end of a next consecutive one of the first endless conveyors in the flow direction, and said first one is laterally offset from said next consecutive one, and wherein one or more of the conveyor modules further includes a third endless conveyor spaced laterally apart from the corresponding first and second endless conveyors and oriented substantially parallel to the flow direction;
   a drive system coupled with the endless conveyors and selectively operable to drive the first and second endless conveyors of each of the conveyor modules independently of one another and independently of the endless conveyors of another one of the conveyor modules;
   a vision camera positioned to detect the successive workpieces on the plurality of conveyor modules; and
   a computer system operatively coupled with the drive system and the vision camera, the computer system configured to control the drive system based at least on data from the vision camera to thereby adjust skew angles of the successive workpieces and gaps between the successive workpieces while the successive workpieces are transported in the flow direction on the endless conveyors of the conveyor modules.

11. The system of claim 10, wherein the drive system includes a plurality of drives, each of the drives operatively coupled with a corresponding one of the endless conveyors.

12. The system of claim 11, wherein each of the conveyor modules includes a corresponding one or more third endless conveyors spaced apart from the corresponding first and second endless conveyors across the flow direction and oriented generally parallel to the flow direction.

13. The system of claim 12, wherein the drive system further includes additional drives operatively coupled with corresponding ones of the third endless conveyors, the additional drives operable to drive the third endless conveyors independently of the corresponding first or second endless conveyors.

14. The system of claim 12, wherein at least some of the drives are operatively coupled with a corresponding one of the second endless conveyors and a corresponding one of the third endless conveyors, such that some or all of the third endless conveyors are driven synchronously with the corresponding second endless conveyors.

15. The system of claim 14, wherein the drives include servo motors.

16. The system of claim 12, wherein the third endless conveyors are disposed at a different vertical height than the first endless conveyors, such that the first and second endless conveyors are collectively operable to support workpieces of a first length and the first and third endless conveyors are collectively operable to support workpieces of a second length.

17. The system of claim 11, wherein the drives include servo motors.

18. The system of claim 11, wherein the drive system is selectively operable to drive the first and second endless conveyors in a first rotary direction and in an opposite second rotary direction.

19. The system of claim 11, wherein the plurality of conveyor modules includes 2-5 of said conveyor modules.

20. The system of claim 19, wherein a first one of the conveyor modules is positioned to accept the successive workpieces from a first transfer upstream of the conveyor modules and a last one of the conveyor modules is positioned to transfer the successive workpieces to a second transfer downstream of the conveyor modules.

21. The system of claim 11, wherein the computer system is configured to cause the drive system to drive the endless conveyors such that the successive workpieces are transported on the conveyor modules at a generally constant velocity from an upstream end of the conveyor modules to a downstream end of the conveyor modules.

22. A method of transporting successive workpieces in a flow direction, with the workpieces oriented generally transverse to the flow direction, the method comprising:
   transferring the successive workpieces onto an upstream end of a plurality of conveyor modules arranged consecutively in the flow direction, wherein each of the conveyor modules includes corresponding first and second endless conveyors spaced laterally apart across the flow direction and oriented substantially parallel to the flow direction, wherein a downstream end of a first one of the first endless conveyors overlaps an upstream end of a next consecutive one of the first endless conveyors in the flow direction, and said first one is laterally offset from said next consecutive one, and wherein one or more of the conveyor modules further includes a third endless conveyor spaced laterally apart from the corresponding first and second endless conveyors and oriented substantially parallel to the flow direction; and
   driving each of the first and second endless conveyors independently of one another to thereby adjust skew angles of the workpieces and gaps between the workpieces while transporting the workpieces from the upstream end of the plurality of conveyor modules to a downstream end of the plurality of conveyor modules.

23. The method of claim 22, further comprising driving the third endless conveyor independently of the corresponding first and second endless conveyors to thereby adjust skew angles of the workpieces and gaps between the workpieces while transporting the workpieces from the upstream end of the plurality of conveyor modules.

24. The method of claim 22, wherein driving the second endless conveyors includes driving the third endless conveyor synchronously with the corresponding one of the second endless conveyors.

25. The method of claim 22, wherein driving the first and second endless conveyors includes driving at least one of the endless conveyors of each of the conveyor modules at generally the same speed to thereby transport the workpieces at a generally constant velocity from an upstream end of the conveyor modules to a downstream end of the conveyor modules.

26. The method of claim 22, wherein driving each of the first and second endless conveyors includes driving two of the endless conveyors in opposite rotational directions to thereby adjust a skew angle of one of the workpieces.

27. The method of claim 22, further including using a vision camera positioned above the conveyor modules to detect the workpieces on the conveyor modules.

28. The method of claim 27, further including adjusting a speed of a transfer upstream of the conveyor modules based on data from the vision camera to thereby adjust gaps between additional workpieces as the additional workpieces are transferred onto the upstream end of the conveyor modules.

29. The method of claim 22, wherein the plurality of conveyor modules includes 2-5 of said conveyor modules.

30. The method of claim 29, wherein a downstream end of the plurality of conveyor modules is positioned proximal to an upstream end of a lugged conveyor, the method further including transferring the successive workpieces to corresponding lug spaces of the lugged conveyor.

* * * * *